United States Patent
Gottin et al.

(10) Patent No.: US 12,524,886 B2
(45) Date of Patent: Jan. 13, 2026

(54) OBJECT-DRIVEN EVENT DETECTION FROM FIXED CAMERAS IN EDGE ENVIRONMENTS

(71) Applicant: Dell Products L.P., Round Rock, TX (US)

(72) Inventors: Vinicius Michel Gottin, Rio de Janeiro (BR); Pablo Nascimento da Silva, Niterói (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 590 days.

(21) Appl. No.: 17/815,340

(22) Filed: Jul. 27, 2022

(65) Prior Publication Data

US 2024/0037752 A1    Feb. 1, 2024

(51) Int. Cl.
G06T 7/12    (2017.01)
G06T 7/13    (2017.01)

(52) U.S. Cl.
CPC . G06T 7/12 (2017.01); G06T 7/13 (2017.01)

(58) Field of Classification Search
CPC .. G06T 7/12; G06T 7/13; G06V 20/44; G06V 20/52; G06V 10/95
See application file for complete search history.

(56) References Cited

U.S. PATENT DOCUMENTS

| | | | |
|---|---|---|---|
| 6,393,362 B1 | 5/2002 | Burns | |
| 8,169,335 B2 | 5/2012 | Frederick et al. | |
| 9,547,969 B2 | 1/2017 | Beggs et al. | |
| 9,576,480 B1 | 2/2017 | Shoshan | |
| 9,671,777 B1 | 6/2017 | Aichele et al. | |
| 9,674,498 B1 | 6/2017 | Mukherjee et al. | |
| 9,764,472 B1 | 9/2017 | Ebrahimi Afrouzi et al. | |
| 10,525,882 B2 | 1/2020 | Bernstein et al. | |
| 10,661,795 B1 | 5/2020 | Li et al. | |
| 10,885,775 B2 | 1/2021 | Herson et al. | |
| 11,086,328 B2 | 8/2021 | Keivan et al. | |
| 11,165,954 B1 * | 11/2021 | Beach | H04N 23/65 |
| 11,232,294 B1 * | 1/2022 | Banerjee | G06T 7/246 |

(Continued)

FOREIGN PATENT DOCUMENTS

| | | |
|---|---|---|
| CN | 106651884 B | 10/2019 |
| CN | 112613586 A | 4/2021 |

(Continued)

OTHER PUBLICATIONS

"How Accurate Are RFID Systems?"—RFID Journal; (Accessed Oct. 28, 2022).

(Continued)

*Primary Examiner* — Chan S Park
*Assistant Examiner* — Sebastian-Sy Vuchi Ngo
(74) *Attorney, Agent, or Firm* — Workman Nydegger

(57) ABSTRACT

Object driven event detection is disclosed for nodes in an environment. Video frames of interest are identified from the video streams of cameras in the environment. The video frames of interest are input, along with node positions for nodes in the area of coverage of the cameras, into a detection module. The output of the detection model, combined with the output of an event model, are used by a decision pipeline to make decisions and perform actions in the environment.

16 Claims, 9 Drawing Sheets

(56) References Cited

U.S. PATENT DOCUMENTS

| | | |
|---|---|---|
| 11,577,741 B1 | 2/2023 | Reschka et al. |
| 12,012,318 B2 | 6/2024 | Gottin et al. |
| 12,093,815 B2 | 9/2024 | Otsuki et al. |
| 12,094,451 B1 | 9/2024 | Zhang et al. |
| 2009/0109049 A1 | 4/2009 | Frederick et al. |
| 2010/0208064 A1 | 8/2010 | Liu et al. |
| 2010/0228427 A1 | 9/2010 | Anderson et al. |
| 2011/0010023 A1 | 1/2011 | Kunzig et al. |
| 2011/0093134 A1 | 4/2011 | Emanuel et al. |
| 2011/0279261 A1 | 11/2011 | Gauger et al. |
| 2012/0025964 A1 | 2/2012 | Beggs et al. |
| 2012/0083947 A1 | 4/2012 | Anderson et al. |
| 2014/0191869 A1 | 7/2014 | Frederick |
| 2014/0324336 A1* | 10/2014 | Prokhorov ......... G01C 21/3602 701/445 |
| 2015/0145661 A1 | 5/2015 | Beggs et al. |
| 2016/0129592 A1* | 5/2016 | Saboo ............... B25J 5/007 700/248 |
| 2016/0180713 A1 | 6/2016 | Bernhardt et al. |
| 2017/0297569 A1 | 10/2017 | Nilsson et al. |
| 2017/0337813 A1 | 11/2017 | Taylor |
| 2017/0337820 A1* | 11/2017 | Glatfelter ............... G08G 1/166 |
| 2017/0356596 A1 | 12/2017 | Frederick |
| 2018/0203727 A1* | 7/2018 | Jarvis ..................... G06F 8/70 |
| 2019/0043351 A1* | 2/2019 | Yang .................. G06F 21/6245 |
| 2019/0138895 A1 | 5/2019 | Jin et al. |
| 2019/0179329 A1* | 6/2019 | Keivan ................ G05D 1/0221 |
| 2019/0268722 A1 | 8/2019 | Elswick et al. |
| 2019/0317219 A1 | 10/2019 | Smith et al. |
| 2020/0225673 A1 | 7/2020 | Ebrahimi et al. |
| 2020/0257310 A1* | 8/2020 | Du ......................... H04W 4/46 |
| 2020/0311559 A1* | 10/2020 | Chattopadhyay ........ G06N 5/01 |
| 2020/0334837 A1* | 10/2020 | Feigl ........................ G06T 7/248 |
| 2020/0380406 A1 | 12/2020 | Dickens et al. |
| 2020/0410281 A1 | 12/2020 | Goel et al. |
| 2021/0089762 A1 | 3/2021 | Rahimi et al. |
| 2021/0192810 A1 | 6/2021 | Paysan et al. |
| 2021/0273858 A1 | 9/2021 | Radovanovic et al. |
| 2021/0295154 A1 | 9/2021 | Groh |
| 2022/0066456 A1 | 3/2022 | Ebrahimi et al. |
| 2022/0089372 A1 | 3/2022 | Phillips et al. |
| 2022/0138943 A1 | 5/2022 | Zhu et al. |
| 2022/0231919 A1* | 7/2022 | Pandey .................... H04W 4/40 |
| 2022/0253647 A1 | 8/2022 | Perkins |
| 2022/0330896 A1 | 10/2022 | Min et al. |
| 2022/0394531 A1* | 12/2022 | Jeong ...................... H04L 41/12 |
| 2022/0409991 A1 | 12/2022 | Ohashi et al. |
| 2023/0030039 A1 | 2/2023 | Drapeko et al. |
| 2023/0068523 A1 | 3/2023 | Santra et al. |
| 2023/0159027 A1 | 5/2023 | Pronovost |
| 2023/0177951 A1 | 6/2023 | Mubarek et al. |
| 2023/0221942 A1* | 7/2023 | Zhang ..................... G06F 8/71 717/168 |
| 2023/0305564 A1 | 9/2023 | Gottin et al. |
| 2023/0368129 A1 | 11/2023 | Gottin et al. |
| 2023/0409881 A1 | 12/2023 | Heitzmann et al. |
| 2024/0019532 A1 | 1/2024 | Gottin et al. |
| 2024/0020549 A1 | 1/2024 | Ferreira et al. |
| 2024/0020557 A1 | 1/2024 | Ferreira et al. |
| 2024/0020571 A1 | 1/2024 | Ferreira et al. |
| 2024/0190473 A1 | 6/2024 | Akella et al. |
| 2024/0214314 A1 | 6/2024 | Zhao et al. |
| 2024/0278797 A1 | 8/2024 | Agrawal et al. |
| 2024/0311731 A1 | 9/2024 | Caron et al. |
| 2025/0077942 A1 | 3/2025 | Chaabane et al. |

FOREIGN PATENT DOCUMENTS

| | | |
|---|---|---|
| CN | 112945227 A | 6/2021 |
| CN | 114460537 A | 5/2022 |
| CN | 114527676 A | 5/2022 |
| DE | 102021200452 A1 | 7/2022 |
| WO | 2011/092229 A1 | 8/2011 |
| WO | 2022/156947 A1 | 7/2022 |
| WO | 2023/287176 A1 | 1/2023 |

OTHER PUBLICATIONS

B. Kim, C. Kang, J. Kim, S. Lee, C. Chung and J. Choi, "Probabilistic vehicle trajectory prediction over occupancy grid map via recurrent neural network," in 20th International Conference on Intelligent Transportation Systems (ITSC), 2017.

C. Hegde, S. Dash and P. Agarwal, "Vehicle Trajectory Prediction using GAN," in Fourth International Conference on I-SMAC (IoT in Social, Mobile, Analytics and Cloud)(I-SMAC), 2020.

Gal, Yarin, and Zoubin Ghahramani. "Dropout as a Bayesian approximation: Representing model uncertainty in deep learning." international conference on machine learning. PMLR, 2016.

Inpixon—Bluetooth Location Tracking & Positioning, https://www.inpixon.com/technology/standards/bluetooth-low-energy (Accessed Oct. 28, 2022).

Link Labs—"The Complete Active RFID Overview", Mar. 14, 2018.

S. Srikanth, J. Ansari, R. Ram, S. Sharma, J. Murthy and K. Krishna, "Infer: Intermediate representations for future prediction," in IEEE/RSJ International Conference on Intelligent Robots and Systems (IROS), 2019.

W.-H. Chung, G. Chakraborty, R.-C. Chen and C. Bornand, "Object Dynamics from Video Clips using YOLO Framework," 2019 IEEE 10th International Conference on Awareness Science and Technology (iCAST), Morioka, Japan, Oct. 23-25, 2019, pp. 1-6, (Year: 2019).

Wikipedia, Autoencoder, https://en.wikipedia.org/wiki/Autoencoder, Jan. 10, 2021.

Liu et al, "T-C3D: Temporal Convolutional 3D Network for Real-Time Action Recognition" AAAI, 2018, (Year: 2018).

B. Alexe, T. Deselaers and V. Ferrari, "Measuring the objectness of image windows," IEEE transactions on pattern analysis and machine intelligence, vol. 11, No. 34, pp. 2189-2202, 2021.

B. McMahan, E. Moore, D. Ramage, S. Hampson and B. y Arcas, "Communication-efficient learning of deep networks from decentralized data.," In Artificial Intelligence and Statistics, pp. 1273-1282, 2017.

C. L. Zitnick and P. Dollár, "Edge boxes: Locating object proposals from edges.," European conference on computer vision, pp. 391-405, 2014.

J. Bernstein, Y. X. Wang, K. Azizzadenesheli and A. Anandkumar, "signSGD: compressed optimisation for non-convex problems," CoRR, vol. abs/1802.04434, 2021.

K. M. Rashid and A. H. Behzadan, "Risk Behavior-Based Trajectory Prediction for Construction Site Safety Monitoring," Journal of construction engineering and management, 2018.

Li, "Federated learning: Challenges, methods, and future directions," IEEE Signal Processing Magazine, vol. 37, No. 3. pp. 50-60, 2020.

Oza, P., & Patel, V. M. (2019). "C2ae: Class Conditioned Auto-Encoder for Open-set Recognition." In Proceedings of the IEEE/CVF Conference on Computer Vision and Pattern Recognition (pp. 2307-2316).

P. Tang, X. Wang, A. Wang, Y. Yan, W. Liu, J. Huang and A. Yuille, "Weakly supervised region proposal network and object detection," Proceedings of the European conference on computer vision (ECCV), 2018.

U.S. Appl. No. 17/585,055, tilled, Edge-Enabled Trajectory Map Generation, filed Jan. 26, 2022.

U.S. Appl. No. 17/663,423, tilled, "Unsupervised Learning for Real-Time Detection of Far Edge Mobile Device Trajectories", filed May 14, 2022.

He, Chaoyang, et al. "Federated Learning for Internet of Things" IEEE Internet of Things Magazine 5.1 (2021): 24-29. (Year: 2021).

* cited by examiner

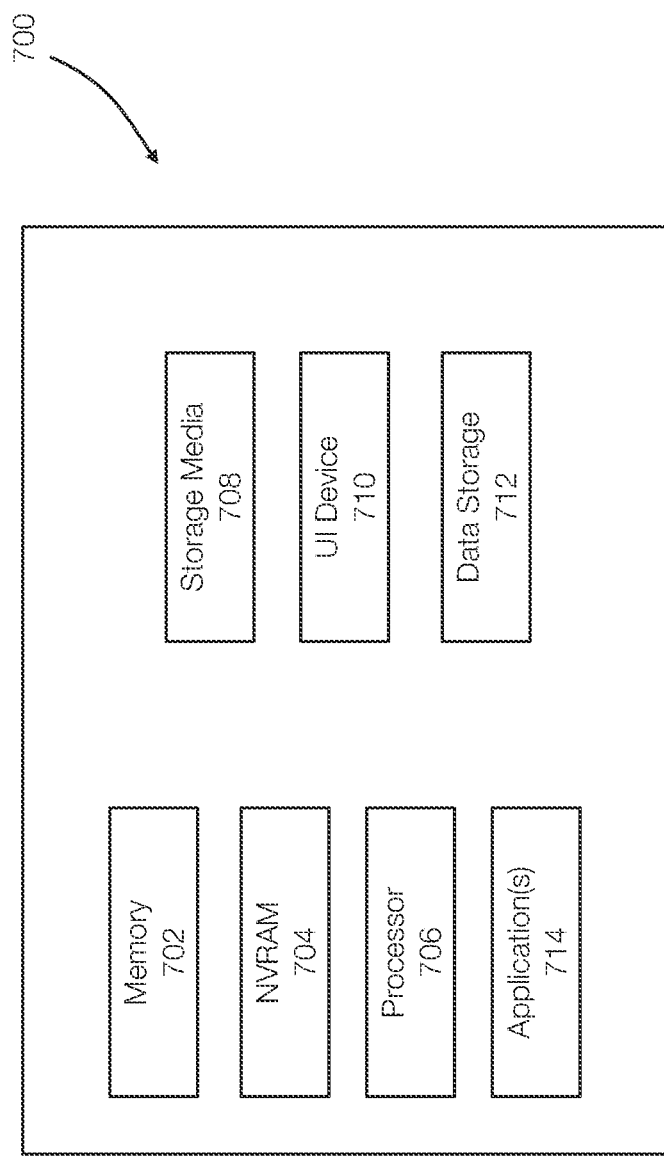

OBJECT-DRIVEN EVENT DETECTION FROM FIXED CAMERAS IN EDGE ENVIRONMENTS

RELATED APPLICATIONS

This application is related to U.S. Ser. No. 17/647,758 filed Jan. 12, 2022, and to U.S. Ser. No. 17/656,351 filed Mar. 24, 2022, which applications are incorporated by reference in their entirety.

FIELD OF THE INVENTION

Embodiments of the present invention generally relate to logistics and event detection. More particularly, at least some embodiments of the invention relate to systems, hardware, software, computer-readable media, and methods for supporting decision making tasks in environments that includes multiple objects.

BACKGROUND

Logistics in an environment such as a warehouse can be difficult to perform at least because many different objects in the environment may exist and/or operate simultaneously. Many of the objects in the warehouse, for example, are autonomous and mobile in nature while other objects are stationary or movable. In essence, all objects in an environment, whether mobile, movable, or stationary, may be a hazard from the perspective of each object. Consequently, it is difficult to coordinate the movement of multiple objects and ensure that undesirable interactions do not occur. Ensuring that a device does not experience an undesirable event (e.g., cornering while moving too fast) by itself is also desirable.

Improving the autonomy of mobile objects would enhance the operation and efficiencies of logistical operations in these environments. Improving the autonomy of mobile objects, however, often requires the locations or positions of the objects in the warehouse to be known. In addition to knowing the position of the objects, it may also be useful to detect objects in the environment that may impact the operation of other objects.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 7 discloses aspects of a computing device, system, or entity.

DETAILED DESCRIPTION OF SOME EXAMPLE EMBODIMENTS

Figure 1:
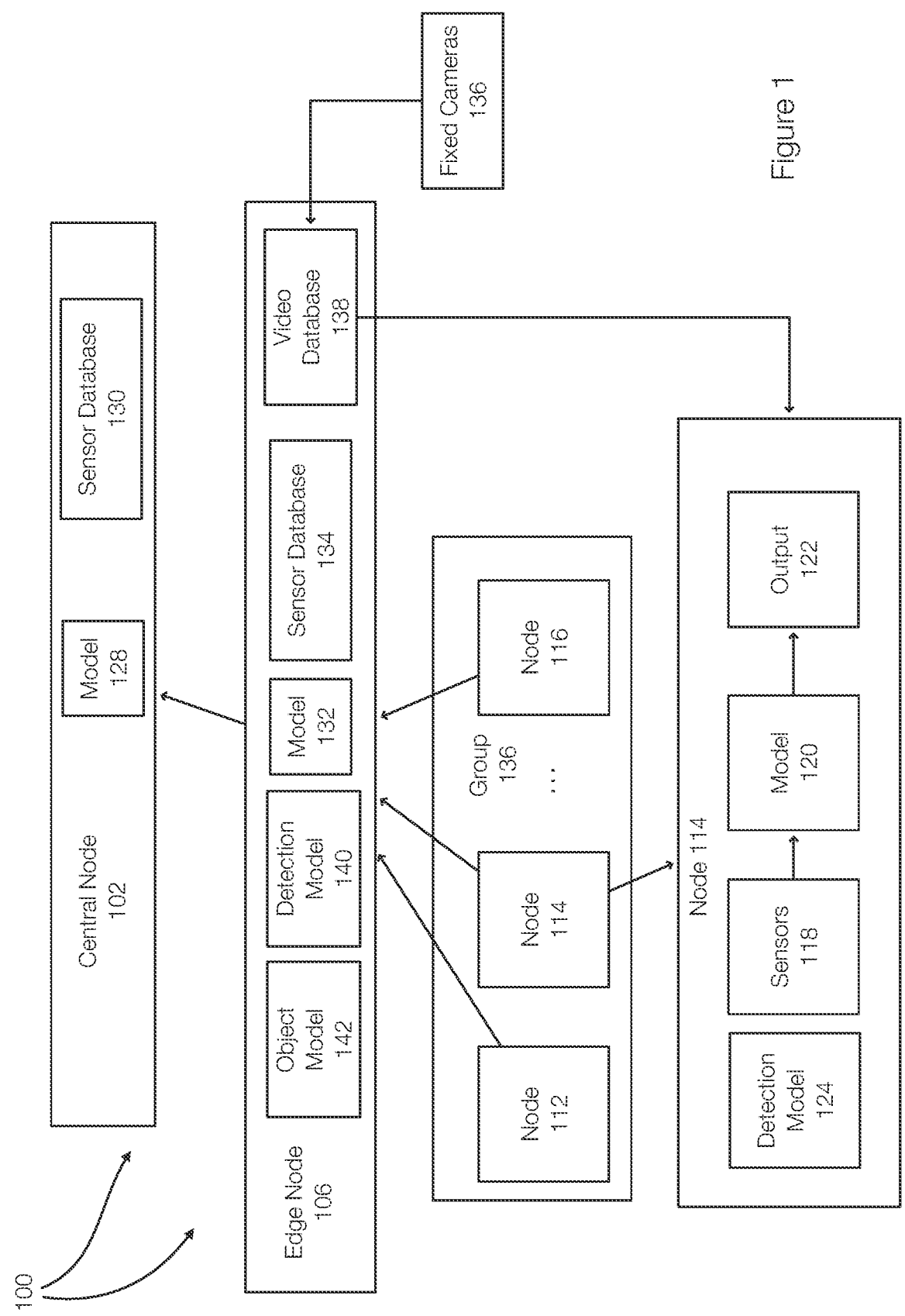
FIG. 1 discloses aspects of an environment in which logistics operations are performed.

Embodiments of the present invention generally relate to logistics and logistics operations in an environment. More particularly, at least some embodiments of the invention relate to systems, hardware, software, computer-readable media, and methods for performing event detection. Event detection facilitates decision-making operations, automation operations, environment assessment operations, auditing operations, or the like.

Embodiments of the invention can be applied or implemented to provide or perform logistics operations in different types of environments. Generally, an environment may include objects, including mobile objects, movable objects, and/or stationary or static objects. These objects may include or be associated with sensors of varying types that generate data.

The data generated by the sensors can be used to perform logistics operations, which include by way of example and not limitation, event detection operations, event-driven object detection operations, alerting operations, decision-making operations, positioning operations, automation operations, safety operations, hazard detection operations, hazard avoidance operations, auditing operations, management operations, or the like or combination thereof. More specifically, embodiments of the invention perform logistics, including decision making operations, based on sensor data generated at nodes and at cameras in an environment.

Embodiments of the invention are discussed in the context of an environment such as a warehouse. A warehouse may be associated with multiple mobile objects, which may include forklifts, automated robots, and the like. Movable objects may include pallets or product. Stationary or static objects may include ports, docks, shelving, corridors, corners, other operational areas, or the like.

From the perspective of a particular object, for example, all other objects may constitute hazards. Embodiments of the invention are achieved, in part, by equipping the objects with hardware such as sensors, processors, memory, networking hardware, or the like. In some examples, the objects may already be equipped with this type of hardware or portions thereof. The hardware may depend on the nature of the associated object. Mobile objects, for example, may be equipped with a different set of sensors compared to sensors or devices associated with a stationary or movable object. For example, hardware such as sensors, processors, memory, or the like may be integrated with a forklift or a robot. A pallet, in contrast, may only have an RFID (Radio Frequency Identification) tag.

The hardware (and/or any software thereon) may be referred to as a node. However, reference to a node may also constitute a reference to the object associated with the node and on which the node is attached. Reference to an object may refer to the object and/or the node.

In one example, a node may be associated with sensors including position sensors, inertial sensors, and/or proximity sensors. Cameras may be placed or located in the environment. Embodiments of the invention allows video data generated from cameras in the environment to be considered by the nodes operating in the environment to perform logistics operations including decision making operations.

For example, a decision pipeline (pipeline) may be configured to perform decision making operations based on outputs of a detection model, an event model, and/or an object model. The detection model has been trained using video data and sensor data to relate the relevancy and frequency of objects during events of interest and the event model is trained using sensor data to detect events (e.g., non-normative cornering, overloaded node, entering dock). The object model may determine that an object is present in a video frame, which becomes a video frame of interest. More generally, the object model may manage and orchestrate the selection of video frames from a video stream.

The detection model relates to a camera that has a coverage area. In fact, each camera may be associated with a different detection model that is trained with the video data of the corresponding camera. When a node is within the coverage area of a camera, the sensor data of that node and the video frame of interest are input to the detection model. Contemporaneously, an event model may infer an event (e.g., at or near a time of the video frame of interest) based on the node's sensor data.

The outputs of the detection model and the event model may be provided to a pipeline, which may make a decision maned on the outputs of these models. The decision may be to generate an alert or perform other action.

For example, the outputs of the detection model and the event model may indicate that the node is near a blind corner, that the node may not be able successfully navigate a corner, or that a person is also in the coverage area of the camera. This may allow appropriate actions to be taken. The ability to detect objects in images can also facilitate auditing (e.g., the ability to identify what objects or persons were involved in an accident stemming from a dangerous cornering event or other event).

Embodiments of the invention focus on obtaining relevant data (e.g., specific video frames) from the video streams. Video frames of interest are identified and processed by the various models operating on the nodes. Each node may include multiple detection models and processing all video data in all models may not be computationally feasible. Identifying video frames of interest allows some of the video data to be discarded with respect to the detection models, even if all video data is retained. Using video frame of interest may advantageously avoid the costs of processing, transmitting, and/or storing large amounts of video data at the nodes. The storage costs at an edge node can also be reduced if only selected video data is stored. The relevant data, such as video frames of interest, can be used for training a detection model.

In general, the sensors associated with an object, in combination with data generated by cameras in the environment, may generate data that can be used to make decisions, perform logistics, detect objects, detect events, record events, detect objects, recognize objects, determine a position/orientation of the object in the warehouse (or its vicinity), velocity, direction of travel, or the like. The sensor data may be processed at the node and/or at the edge node to detect/identify objects and events, determine a position of the object and/or predict a trajectory of the object and/or perform localized decision-making operations.

A warehouse is an example of a dynamic edge environment in which quickness and accuracy in decision making (including safety related decisions) is useful. Data originating at a node may be collected at the node and processed using computing resources of the node. Data from all objects may be received by an edge node and/or a central node (e.g., container(s), physical machine(s), server(s), virtual machine (s)) operating at a near-edge infrastructure (or the cloud) and processed using resources of the near-edge infrastructure (or cloud).

FIG. 1 discloses aspects of an environment in which embodiments of the invention may be deployed or implemented. FIG. 1 illustrates a system (e.g., a logistics system) 100 that includes a central node 102(A) and an edge node 106(N). Although both a central node 102 and an edge node 106 are illustrated, embodiments of the invention are not required to have both. Either of the central node 102 and the edge node 106 can assume the responsibilities and/or functions of the other. Plus, the manner in which responsibilities/functions are divided can vary. In some examples, references to the central node can be interpreted as references to the edge node and vice versa. In one example, an edge node may be a central node from the perspective of the nodes.

The edge node 106 may be associated with a set or group 136 of nodes ($E_0, \ldots, E_1$), represented by the nodes 112, 114, and 116. In this example, forklifts or automated mobile robots (or the resources thereon) may be examples of the nodes 112, 114, and 116.

The node 114 ($E_1$) may include sensors 118 and an event model 120, which generates an inference or an output 122. The event model 120 may be representative of multiple models that may aid in detecting different types of events. These models may each generate an output or inference that can be used to infer or not infer an event. The data generated by the sensors 118 may be stored as a sensor dataset.

In some examples, the data generated by the sensors 118 is provided to the central node 102, which may include an event model 128 and a sensor database ($S^i$) 130. The event model 120 may be a copy of the event model 128. The edge node 106 may include an event model 132 and sensor database 134. The event model 132 may also be a copy of the event model 128. The sensor database 134 may store sensor data received from all of the nodes 112, 114, 116. The sensor database 130 may store data in the sensor database 134 as well as sensor data from other edge nodes. As previously stated, if the central node 102 is not present, the edge node 106 may perform functions of the central node 102. Similarly, the edge node 106 may be omitted and the nodes 112, 114, and 116 may interact with the central node 102.

At the node 114, only the recently generated sensor data is generally stored. Local sensor data may be deleted after transmission to the central node 102 and/or to the edge node 106. Inferences for a time t are generated using the most recent sensor data. When working with trajectories, the event model 120 may use one or more collections of sensor data to determine a trajectory. For example, a trajectory may be inferred from three successive position and/or inertial samples. The output 122 (e.g., inference q) of the event model 120(M) may be used for decision making with little delay at the node 114. In one example, a trajectory prediction model may use the one or more collections of sensor data to determine the trajectory and/or to determine or infer a predicted position. The prediction position may be the position input to the detection model.

The edge node 106 may be configured to communicate with the nodes in the group 136. The communication may be performed using radio devices through hardware such as a router or gateway or other devices (e.g., the edge node 106). The node 114 may also receive information from the edge node 106 and use the information to perform various operations including logistics operations.

The sensors 118 may include position sensors, inertial sensors, proximity sensors, and/or other sensors that generate sensor data that may be used to determine, by way of example, a position, a trajectory, or other characteristics or aspects of a node in the environment. The sensor data can be collected as time series data, which can be analyzed to determine a position of the node, a velocity of the node, a trajectory or direction or travel, a cornering, or the like. The inertial sensors allow acceleration and deceleration to be detected in multiple directions and axes.

In one example, a map of the environment is generated and may be stored at the central node 102 and/or at the edge node 106. The system may be configured to map the position data received from (or inferred by) the nodes into a map of the environment. The node 114 can determine its own position within the environment. The positions of all nodes (objects) can be determined with respect to each other and with respect to the environment. The position of a node may be determined by the edge node 106. The map may also include or identify coverage areas for cameras. The coverage areas can be compared with positions of nodes to determine which nodes are in which coverage areas.

In this example, a video database 138 may store data received from fixed cameras 136 in the environment. The video data may be used, along with the sensor data, to generate inferences using machine learning models, such as the detection models 124 and 140. The fixed cameras 136 may each be associated with a field of view. More specifically, each of the fixed cameras 136 is associated with an area of coverage that corresponds to an area of the environment. If the camera is movable (e.g., the camera rotates or can be controlled remotely), the area of coverage of the fixed cameras 136 may change over time.

In one example, the event model 120 is trained at the central node 102 and deployed to the relevant nodes 112, 114, and 118. The event model 120 is trained using available (historical) positioning and/or inertial measurement data (and/or other sensor data, which may include video data). After training, the event model 120 may be deployed to the nodes. During operation, the event model 120 may operate using locally generated data at the node 114 as input while the event model 128 (or 132) may use sensor data 130 (134) generated from multiple nodes, which may be in different environments.

The object model 142 may identify video frames of interest in the video database 138. The detection model 140 and/or 124 may use the video frames of interest and/or sensor data to generate inferences.

The sensors 118 may generate data used by the event model 120 to generate an inference or other output 122. The video data stored in the video database 138 (or selected video frames) may also be used by the detection models 124 and 140. The video database 138 or, more generally, the video data, may be used with the sensor database 134 to detect events such as dangerous cornerings, excessive loads, entering/exiting docks, collisions, or other events. The data may also be used to perform decision-making, such as whether to generate an alert, cut power to a node, message an administrator, log an event, or the like. The output of the event model and/or the detection model may be jointly used by a pipeline to perform decision making.

Figure 2:
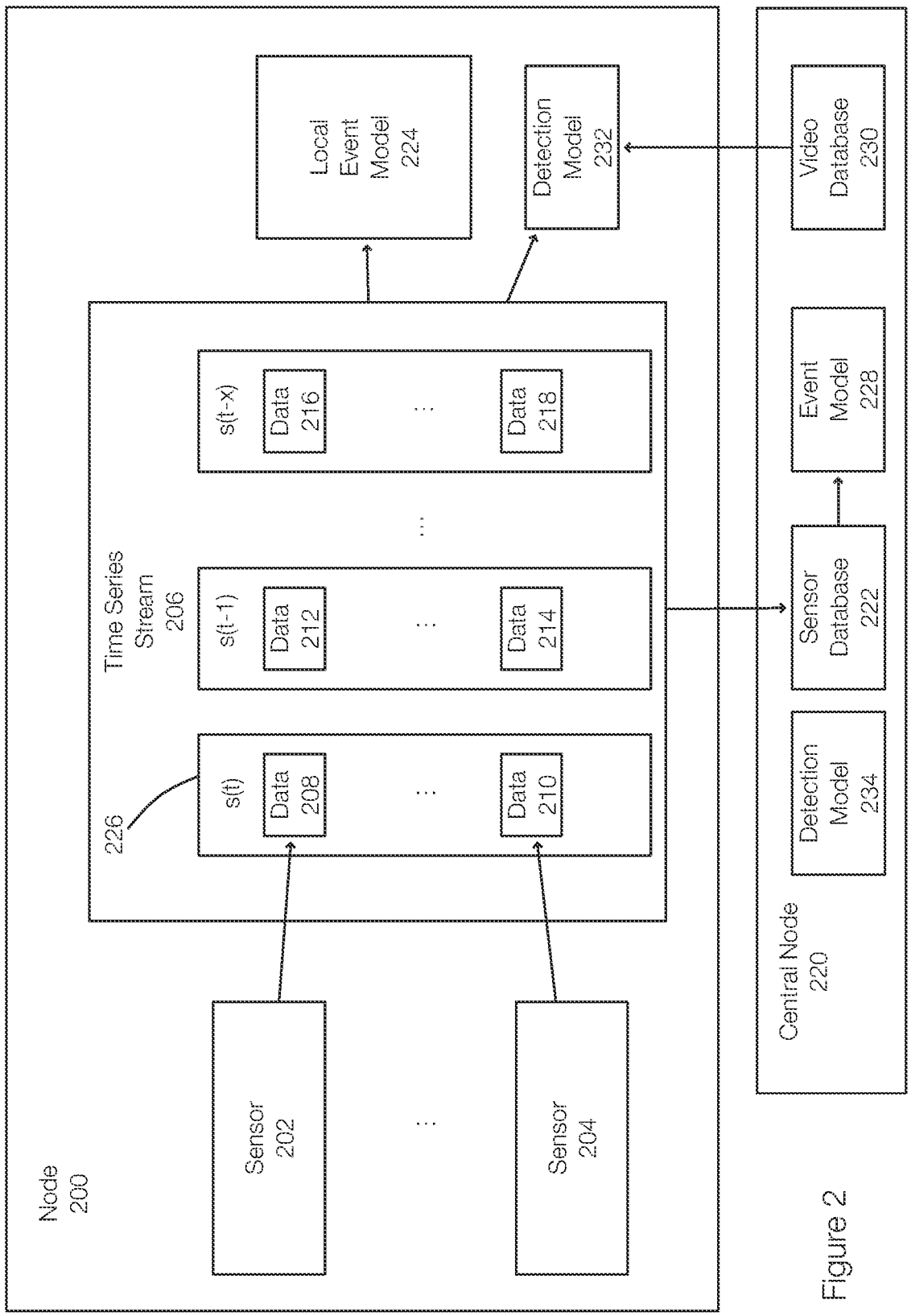
FIG. 2 discloses aspects of discloses aspects of data generated by sensors in an environment and used in performing logistics operations.

FIG. 2 discloses aspects of a node associated with or integrated with an object and configured to operate in an environment and perform logistics operations. The node 200, an example of the node 114, may include sensors, represented by sensors 202 and 204. In this example, the sensors 202 and 204 may include position sensors, proximity sensors, and/or inertial sensors.

The node 200 collects, over time, multiple readings from the sensors 202 and 204. The data generated by the sensors 202 and 204 may constitute a time series stream 206. For example, the stream 206 includes readings at different times and the data collected at a particular time may be referred to as a collection. Thus, the time series stream 206 may include multiple collections such as the collection 226.

The data 208 and 210 in the collection 226 were collected at time s(t), the data 212 and 214 were collected at time s(t-1), and the data 216 and 218 were collected at time s(t-x). Each of the nodes that includes sensors may generate a similar sensor data stream. Data generated from the sensors 202 and 204 may be collected periodically, whenever a change in a sensor's data is detected (e.g., acceleration or deceleration is detected), or the like or combination thereof. In one example, there may be a time series stream for positional data, a time series stream for inertial data, or the like. Further, time series streams may be coordinated in time. A collection of inertial data may correspond to a collection of position data.

The data collected from the sensors 202 and 204 is associated with or includes position data that can be mapped into coordinates of the environment 100. Thus, for the collection of data associated with time s(t), a position p(t) is associated with the collection 226 of data. When collecting data from the sensors 202 and 204, the collection of data is typically correlated to a position in the environment. Other data, for objects such as a forklift, may include mast position, load weight, or the like. The data collected from node may depend on the object. In some examples, position data is determined at the central node 220 and provided to the node 200 in a delayed manner. The node 200 may correlate the delayed position data with the other sensor data. As previously stated, the central node 220 may be a near edge node.

The time series stream 206 may be transmitted to a central node 220 and stored in a sensor database 222 of or associated with the central node 220. Thus, the time series stream 206 is available for use by the local event model 224 to generate inferences, such as whether an event is occurring/has occurred. The time series data from all nodes in the environment is available to the model 228, which may perform the same or similar function as the local event model 224 but may generate inferences based on sensor data from multiple nodes.

The central node 220 may also include a video database 230, which stores video data, which includes video streams, from cameras in the environment. Video data or selected portions (video frames of interest) of the video data in the video database 230 may also be provided to the detection model 232. In one example, the video database 230 may only store video frames that have been identified as including an object—video frames of interest. As discussed in more detail below, each video frame received from a camera can be given an objectness score and video frames that satisfy an objectness threshold may be selected as video frames of interest and used for event detection or other operations. As discussed in more detail herein, the detection model 232 may alternatively be executed at the central node 220 as the detection model 234.

Figure 3A:
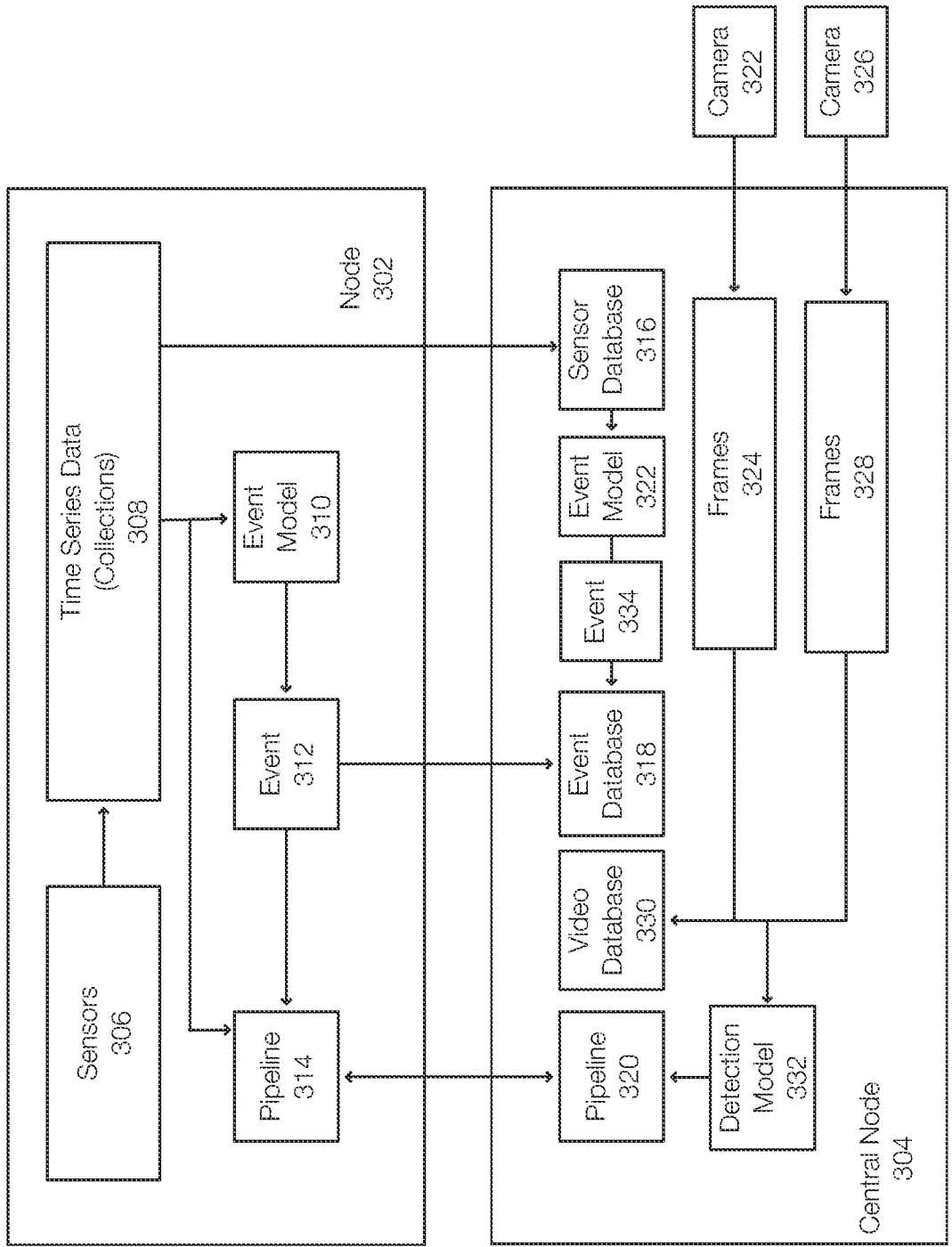
FIG. 3A discloses aspects of performing logistics information based on video streams generated by cameras in an environment.

FIG. 3A discloses aspects of object-driven event detection in an environment. In FIG. 3A, the sensors 306 generate data that is captured as time series data 308. The time series data 308 includes collections as previously described. The time series data 308 may be delivered to the central node 304 and stored in a sensor database 316.

An event model 310(Q), which may have been previously trained, is deployed to the node 302. The event model 310, by processing one or more collections of the time series data 308, may detect an event 312 (e Q). Stated more specifically, the output of the event model 110 may be a probability that a particular event has or is occurring. The event 312 is used to inform the pipeline 314(P). The pipeline 314 may be configured to make decisions based on the event 312 detected by the event model 310.

The pipeline may be domain dependent and may include additional processes, models, or the like or may receive input from other sources, including other models. The pipeline 314 may be configured to make decisions such as generating an alarm if the event 312 indicates that the node 302 is too close to another node or hazard. The pipeline 314 may also conduct communications to and from the central node 304 and/or other nodes.

In this example, the events 312 are communicated to the event database 318 (Q) and the pipeline 314 may also communicate decisions, or other data/inferences to the pipeline 320 (P'), which may allow decisions to be made from a holistic view of the environment.

The central node 304 may have an event model 322 (Q'), which may be trained using the sensor database 316(S) or other data. The event model 322 is similar to or identical to the event model 310. The event model 322 at the central node 304 may be trained with the data in the sensor database 316. In one example, the models 310 and 322 are trained with the same data.

In one embodiment, the event 312 may not be communicated to the event database 318. Rather, the event model 322 may generate an inference (the event 334) using the event model 322 and data communicated to the sensor database 316 from the nodes in the environment including the node 302. The event 334 may be stored in the event database 318. In one example, the central node 304 may replicate the computation using the event model 322. In one example, this is performed when the event model 310 and the event model 322 are deterministic and/or when there are multiple nodes associated with the central node 304, which impacts communication costs. In these examples, the central node 304 may accumulate a database of events in the event database 318(Q). The events may be received from multiple nodes in the environment.

The central node 304 may receive video data that is represented by frames 324 and 328 from cameras 322 and 326, which are representative of cameras in the environment. The video data or frames 324 and 328 may be processed and stored in a video database 330. More specifically, selected frames (video frames of interest) may be stored in the video database 330 and/or used in logistics operations. The frames 324 and 328 and/or selected frames may be input to the pipeline 320 and/or the pipeline 314. This allows decisions to be made based on video data or selected video data. More specifically, the frames (and/or video frames of interest) and position data from the sensor database 316 may be input to the detection model 332. The inference from the detection model 332 may be input to the pipeline 320 and/or the pipeline 314.

Figure 3B:
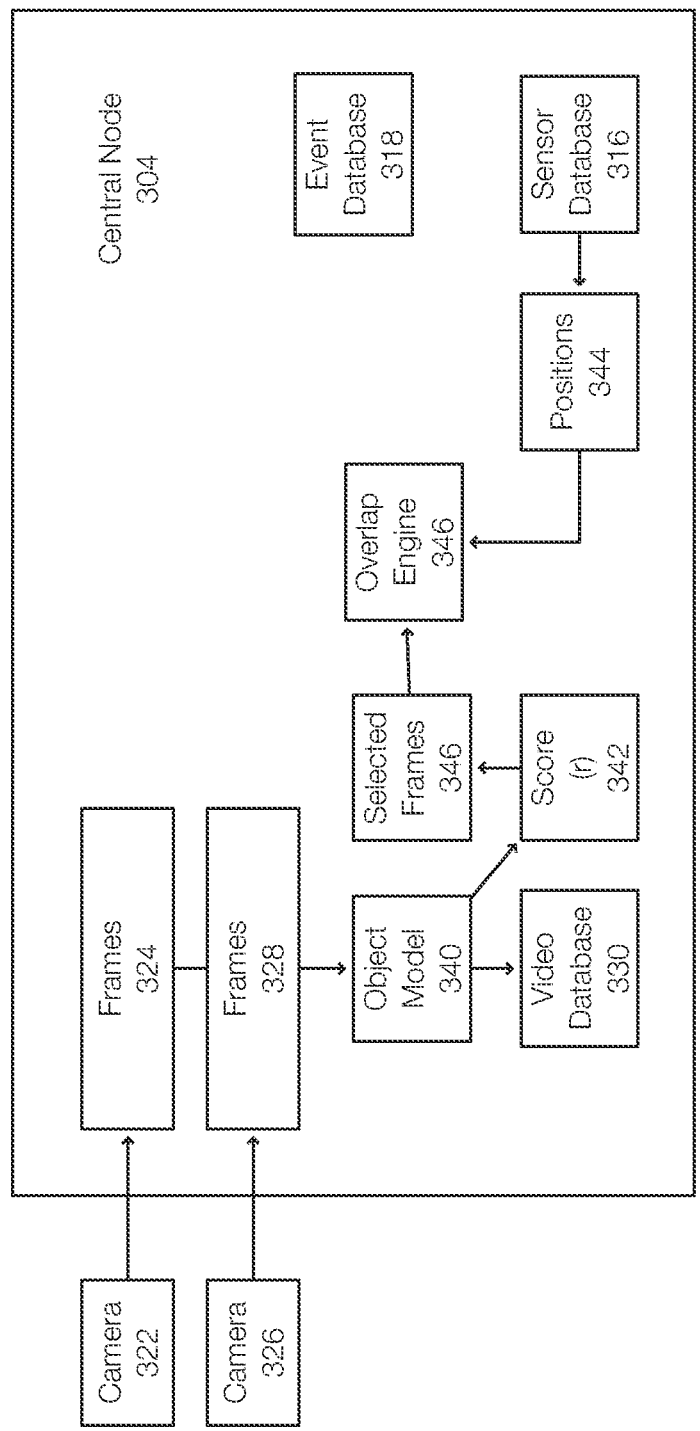
FIG. 3B discloses aspects of analyzing video streams, including detecting objects in video frames and correlating video frames or video data with current or near-current object positions in an environment.

FIG. 3B discloses additional aspects of performing logistics. FIG. 3B illustrates an object model 340 that is configured to determine whether an object exists in a video frame. Thus, frames 324 and 328, which represent the video frames in the video streams received at the central node 304 from the cameras 322 and 326 are processed by the object model to identify video frames that include or are believed to include an object.

In one example, the object model 340 receives all video frames 324 and 328. The object model 340 may operate on individual video frames from each of multiple cameras, multiple frames from a specific camera, sets of consolidated frames, or collections of frames from multiple cameras. Further, the object model 340 may evaluate specific frames, such as frames that include motion. Alternatively, the object model 340 may operate on every nth frame, at least because many of the frames in a video stream are similar to each other, depending on the frame rate.

More specifically, the object model 340 determines whether an object is present in the frames. The object model 340 may compute cues using purpose specific processing methods in an image window and perform a Bayesian aggregation step to yield an objectness score 342. Example cues include, by way of example, color contrast, edge density, superpixel straddling, number of edges, or the like or combination thereof. In some examples, the object model 340 may be trained using datasets of available images, using label information to derive indications of objects.

The object model 340 operates at the central node 304, but may be deployed to the nodes in the environment where resources permit. The objectness score r 342 allows specific video frames 346 to be selected, which includes video frames that are more likely to include an object associated with an event. In other words, the object model 340 identifies or selects video frames of interest from the frames 324 and 328.

In some examples, frames from the frames 324 and 328 that do not have an objectness score r 342 greater than a threshold objectness score may be discarded. All frames or frames with a sufficient objectness score are stored in the video database 330.

The positions 344 may be a table of positions for each of the nodes in the environment. More specifically, the positions 344 relates each node to its current position in the environment. The positions 344 may be included in or extracted from the sensor database 316. The positions 344 may also be generated separately at the nodes.

The positions 344 may be the current positions known to the nodes. In one example, trajectory prediction models may be used to estimate or predict a position. Thus, the positions 344 may include the most recent or current positions or predicted positions. The positions 344, more generally, include the current positions of nodes in the environment. The positions 344 may be delayed and thus be adjusted to account for any delay in transmitting the positions to the central node 304.

In this example, the selected frames 346 may be provided to the overlap engine 346. Because the source or camera of each video frame is known and because the area of coverage (area) of each camera is also known, the overlap engine 346 can determine whether a node is in the area of coverage of a specific camera. In one example, the detected object in the frame may be the node. In another example, the detected object may be a hazard from the perspective of a node that is in the coverage area or near (e.g., about to enter) to the coverage area. Thus, the coverage area is relevant to nodes inside of and outside of the camera's coverage areas. The overlap engine 346 allows an area of coverage of each of the cameras 322 and 326 to be compared with the positions 344 of the nodes. If the area of coverage changes, the area of coverage may need to be determined as needed when determining which nodes are in which areas of coverage.

More specifically, the overlap engine 346 can identify when nodes are in areas of coverage associated with the selected frames 346. When the overlap engine 346 determines that a node is in the coverage area of a specific camera and the video frame of interest is from that camera, the video frame (and/or sensor data of the node) are provided as input to the detection model corresponding to the same camera. then be provided to a model at the nodes and used to generate an inference.

Figure 4:
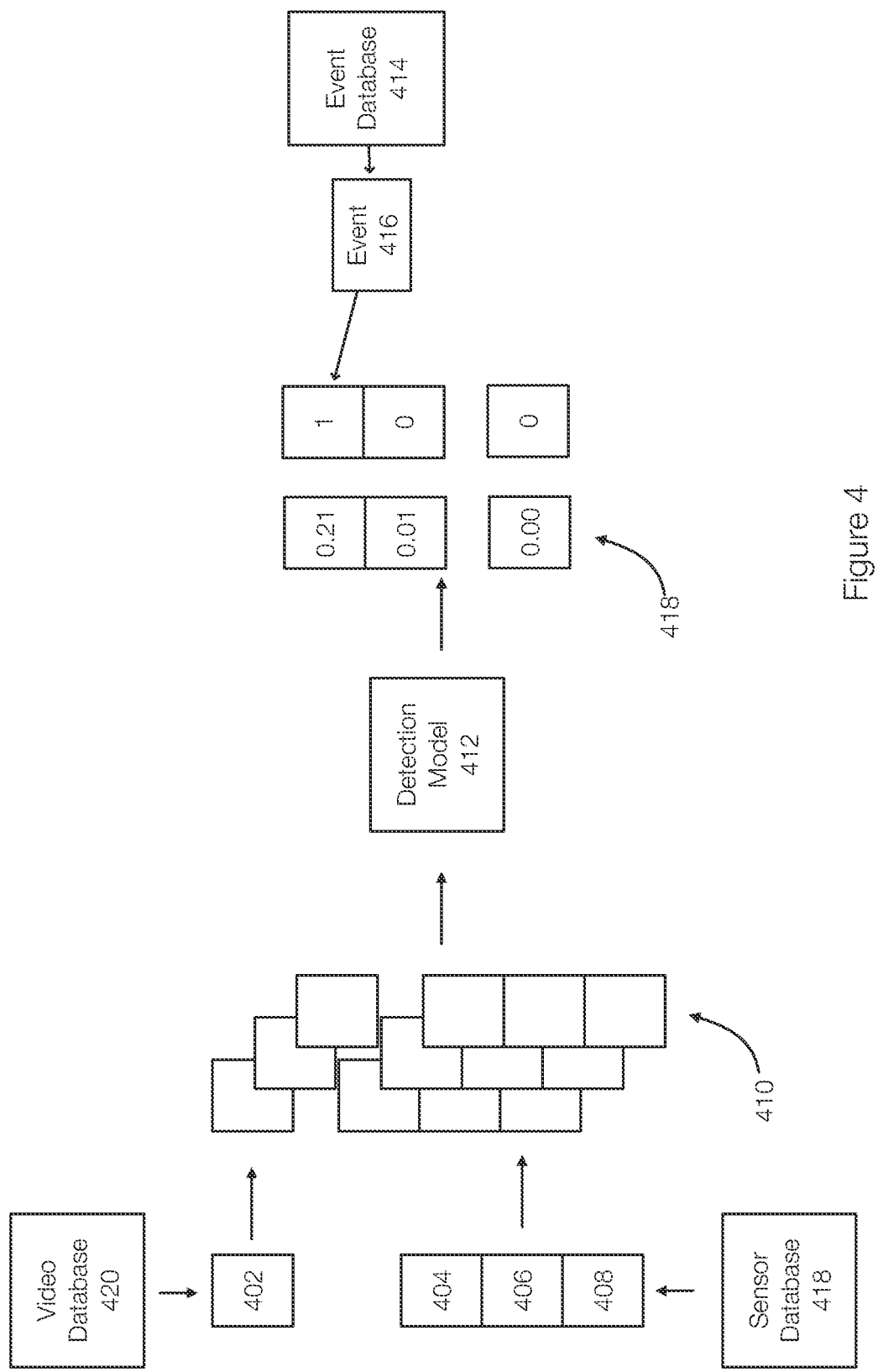
FIG. 4 discloses aspects of training detection models, one detection model for each camera in the environment.

FIG. 4 discloses aspects of training a detection model. The detection model 412 is trained to relate the relevancy and the frequency of objects during events of interest. This is achieved by associating video frames of interest (e.g., frame 402 from the video database 420) of a node and/or a camera and sensor data of a node to the events detected in historical data of the node. In other words, the historical event indications for a node $E_1$ are stored as events e Q stored in the event database 414. The detection model 412 can be trained using the historical sensor data and historical video frames of interest.

The detection model 412 is typically trained for video frames associated with a specific camera. Consequently, video frames from each of the cameras in an environment may be used to train a corresponding detection model. As a result, models $Z_0, \ldots, Z_n$ corresponds to cameras $F^0, \ldots, F^n$.

In one example, for a node $E_j$ and a camera $F^j$, a model Z is obtained that relates the camera $F^j$ and the sensor data relative to a node to an indication of the occurrence of each known event in the domain.

In this case, the inputs to the model 412, during training, may include a video frame of interest 402 collected at a timestamp time t, sensor data 404, 406, and 408 from the sensors of the node $E_j$ that also have the same or similar timestamp (near in time). One or more of these collections 410 are the input to the detection model 412. In one example, a collection 410 may include sensor data and a video frame at time t. In another example, the collection 410 may include sensor data and frames from more than one timestamp. If the timestamps of the video frame of interest 402 and the sensor data 404, 406, and 408 are not an exact match, some error or threshold time difference may allow these data to be input as a single input to the detection model 412. In other words, if the timestamp of the video frame 402 is close enough (e.g., within 1 second) to the timestamp of the sensor data 404, 406, and 408, the collection may be input together to the detection model 412.

The output of the detection model 412 is an array 418 of n values in one example. Each position indicating the occurrence of an event of a corresponding known event class at timestamp t. To perform the training in a supervised fashion, the labels are determined as follows. Each event indication e Q related to the node $E_1$ in Q that has a matching timestamp t determines a positive label for the corresponding event class for $f_t^j$, $S_j^t$.

More specifically, the event 416 in the event database 414(Q) is assigned a value of 1 in the corresponding position of the array 418. This allows supervised learning to be performed when training the detection model 412 ($Z_j$).

When training is completed, there is a model $Z_j$ for each camera $F_j$. Once the detection model 412 (or detection models) are trained, the detection model 412 can be deployed in at least two different manners. First, the detection models may be deployed to each of the nodes. When the nodes have sufficient computational resources to perform multiple inferences, the detection models 412 are deployed to the nodes. It is also beneficial if communication between the nodes and the near edge node is not slow or limited.

In another example, the detection model 412 is deployed to the near edge node. This may be performed when communication is not suitable and/or when the nodes do not have sufficient computing resources to perform inferences using multiple models.

Figure 5A:
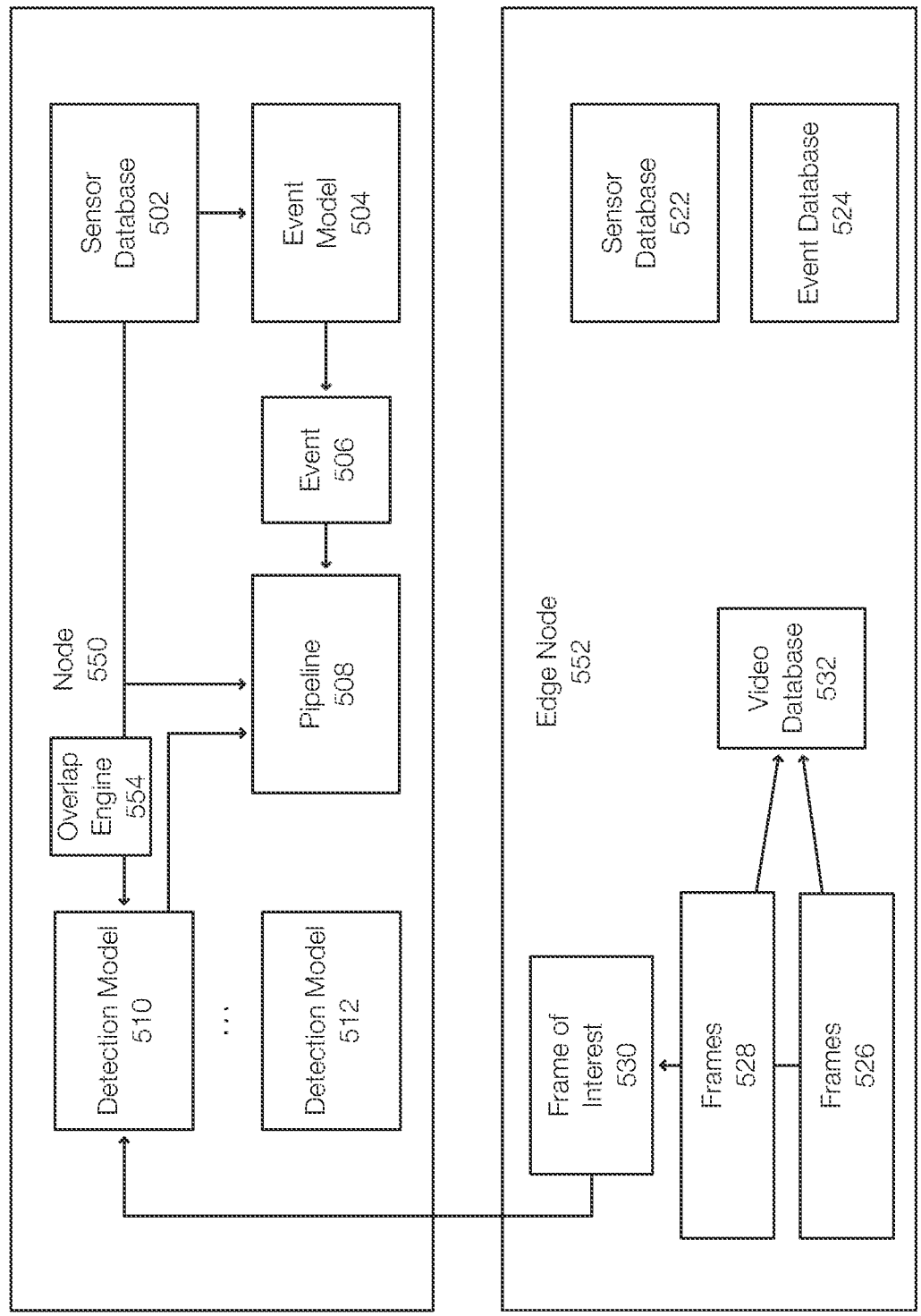
FIG. 5A discloses aspects of deploying detection models and to generating inferences at the nodes.

FIG. 5A discloses aspects of deploying detection models to a node in an environment. The detection models, trained as described in FIG. 4, are deployed to the node 550 and represented by the detection models 510 and 512. The sensor database 502 includes sensor data from the sensors at the node or represents output of the sensors of the node 550. The sensor data generated at the node 550 is input to the event model 504, which may be configured to detect an event 506. More specifically, the event model 504 may output an inference, which may be a probability of detecting the event 506. The event 506 (or the inference) may be input into the pipeline 508.

The detection model 510 may receive a frame of interest 530 and sensor data from the sensor database 502 or the sensors. More specifically in one example, the detection model 510 may operate when there is a video frame of interest and when the position of the node 550 is inside an area of coverage of a camera that generated the frame of interest 530. As previously stated, an overlap engine 554 may determine when the node 550 is within the area of coverage of a camera.

The detection model 510 may output an inference regarding an event, based on the training. The inference generated by the detection model 510 is provided to the pipeline 508. The pipeline 508 may perform an action based on the inference from the detection model 510 and the event 506 identified by the model 504.

This illustrates an example of object-driven event detection. The event detected by the event model 504 may be strengthened by the detection of an object in the frame of interest 530. The combination of the models 504 and 510 allows the pipeline 508 to perform object-driven event detection and perform decision making accordingly.

As previously stated, the frame of interest 530 may be detected from the frames 526 and 528. The frames may be stored in the video database 532. Positions 534 of the node 550 may be stored in the sensor database 522. The edge node 552 may also include an event database 524.

Figure 5B:
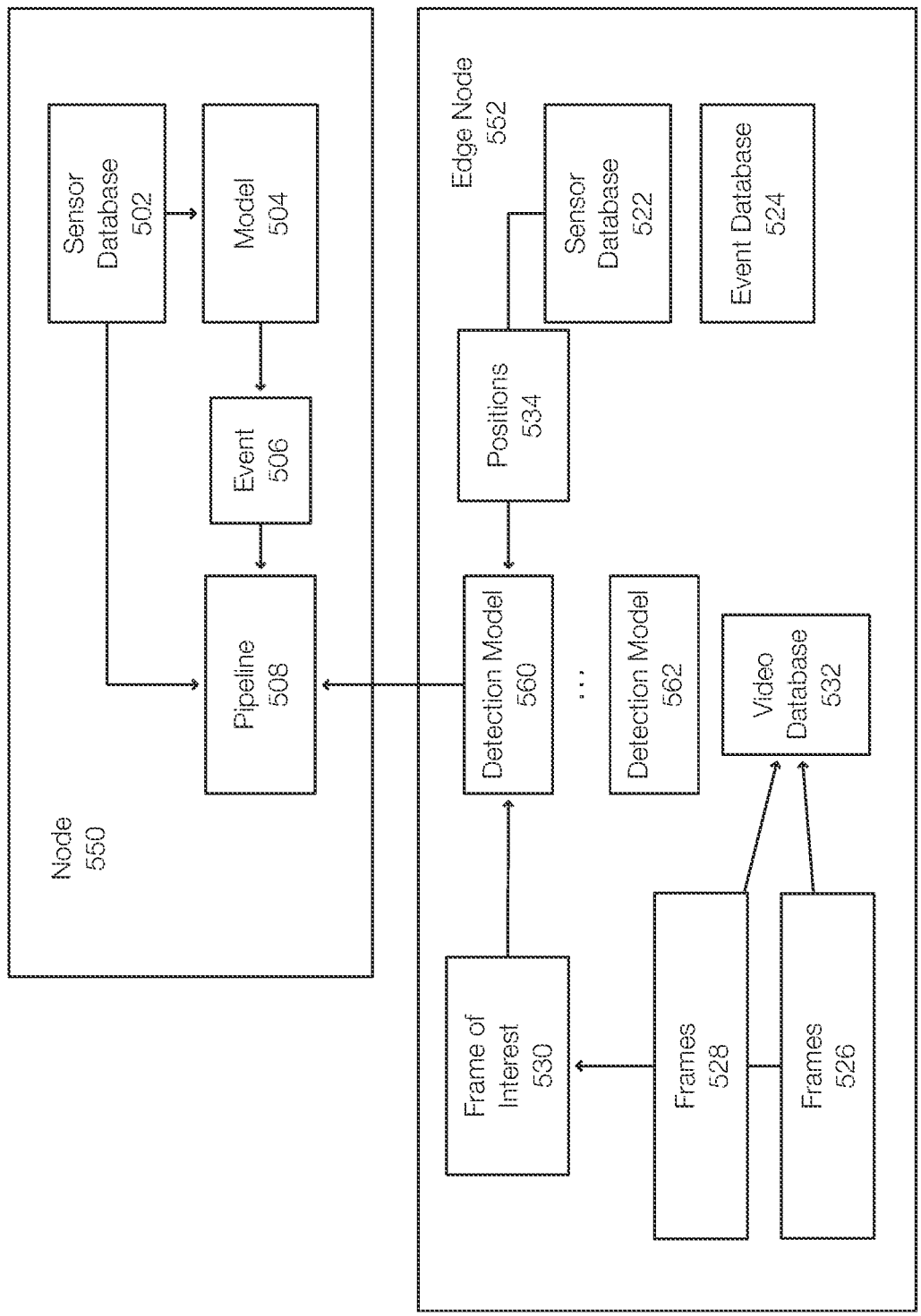
FIG. 5B discloses aspects of deploying detection models to a near edge node.

FIG. 5B discloses aspects of deploying detection models to the edge node 552. In this example, the detection model, represented as the detection models 560 and 562, are deployed at the edge node 552. The detection model 560 may use the frame of interest 560 and positions 534 from the sensor database 522 to generate an inference. The inference from the detection model 560 is transmitted to the node 550 and delivered to the pipeline 508, which also receives the event 506 inferred from the model 504.

Figure 6:
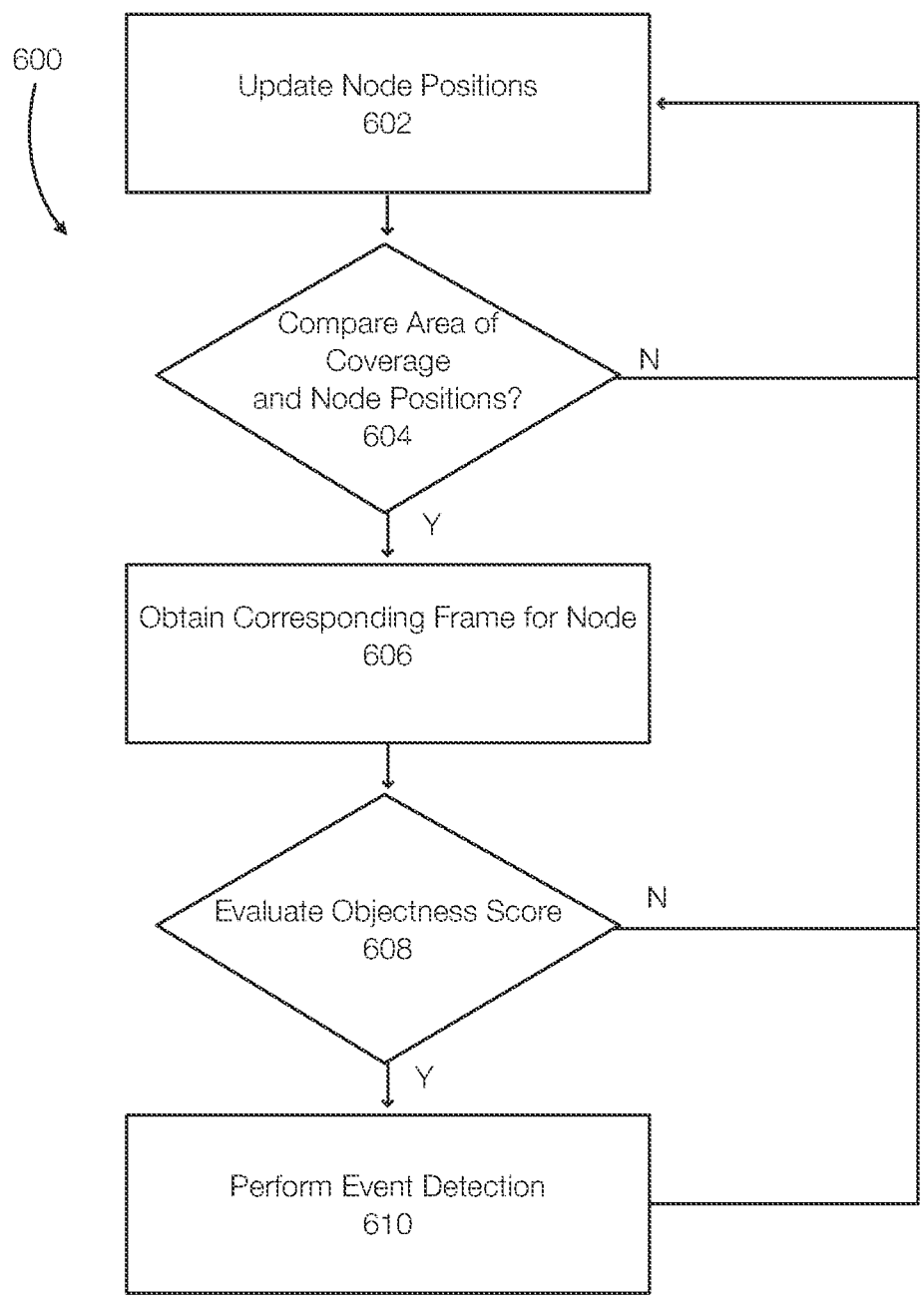
FIG. 6 discloses aspects of decision making based on event driven object detection.

FIG. 6 discloses aspects of decision making. The method 600 can be applied to a single node or to multiple nodes at the same time. In the method 600, node positions are updated 602. This may include updating a position or a position database from the sensor data generated at the node. The node positions may be updated when new sensor data is received or generated by the sensors at the nodes. The node positions are compared 604 to the coverage areas of cameras in the environment. If a node is not in the coverage area of a camera (N at 604), the method 600 may repeat the process by updating the node positions 602.

If a node is in the coverage area (Y at 604), the video frame corresponding to the camera is obtained 606 (or which may already be available) for a time corresponding to a timestamp of the node's position. The objectness score of the frame is evaluated or determined 608. If the objectness score 608 is above a threshold score (Y at 608), the video frame is deemed a frame of interest and may be input to a detection model along with the position data of the node.

If the video frame does not a sufficient objectness score (N at 608), the method may return to updating 602 the node positions. If the video frame is a video frame of interest, decision making such as event detection may be performed 610. Event detection may include generating an inference at or performing a decision by a pipeline by providing both the event model output and the detection model output to the decision pipeline.

The following is a discussion of aspects of example operating environments for various embodiments of the invention. This discussion is not intended to limit the scope of the invention, or the applicability of the embodiments, in any way. New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, container, or virtual machines (VM).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

Example embodiments of the invention are applicable to any system capable of storing and handling various types of objects, in analog, digital, or other form.

It is noted that any of the disclosed processes, operations, methods, and/or any portion of any of these disclosed herein, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: for each mobile node in an environment: determining a position of a node operating in an environment, wherein the node includes sensors that generate sensor data, determining that the node is in an area of coverage of a camera in the environment, inputting the position and a video frame of interest generated by the camera into a detection model, inputting an output of the detection model and an output of an event model into a decision pipeline, and performing an action by the decision pipeline base on the output of the detection model and the output of the event model.

Embodiment 2. The method of embodiment 1, further comprising determining the position of the node using position sensors at the node.

Embodiment 3. The method of embodiment 1 and/or 2, further comprising determining a predicted position of the node using a trajectory prediction model, wherein the position of the node input to the detection model is the predicted position.

Embodiment 4. The method of embodiment 1, 2, and/or 3, further comprising determining an objectness score for video frames received from the camera in the environment and/or wherein the video frame of interest selected from the video frames has an objectness score greater than a threshold objectness score, and/or wherein a timestamp of the video frame of interest and a timestamp of the position of the node are the same or sufficiently close in time.

Embodiment 5. The method of embodiment 1, 2, 3, and/or 4, further comprising deploying the detection model to the nodes operating in the environment or running the detection model on an edge node configured to operate with the nodes operating in the environment.

Embodiment 6. The method of embodiment 1, 2, 3, 4, and/or 5, wherein the environment includes a plurality of cameras, each of the cameras associated with an area of coverage and each of the cameras associated with a different detection model.

Embodiment 7. The method of embodiment 1, 2, 3, 4, 5, and/or 6, further comprising training the detection model using historical positions of the node that correlate with historical video frames of interest in a video database and historical events included in an event database.

Embodiment 8. The method of embodiment 1, 2, 3, 4, 5, 6, and/or 7, wherein the positions of the nodes are stored in a table that relates the positions of the nodes to the nodes, further comprising updating the positions of the node in the table using at least most recent sensor data.

Embodiment 9. The method of embodiment 1, 2, 3, 4, 5, 6, 7, and/or 8, wherein the decision pipeline performs object-driven event detection and performs actions based on detected events.

Embodiment 10. The method of embodiment 1, 2, 3, 4, 5, 6, 7, 8, and/or 9, wherein updating the positions includes updating the positions with predicted positions.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module', 'component', 'model', 'engine' or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

With reference briefly now to FIG. 7, any one or more of the entities disclosed, or implied, by the Figures, and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an environment that includes an edge node in communication with nodes operating in the environment over a network, wherein the environment includes a plurality of cameras that are each associated with an area of coverage in the environment, a method for performing object based detection, the method comprising:
for each node in the environment:
determining a position of a node operating in the environment at the node, wherein the node includes sensors that generate sensor data that includes position data;
inputting the sensor data into an event model operating at the node, wherein the event model generates an inference of an event based on the sensor data;
determining, by an overlap engine, that the node is in an area of coverage of a camera in the environment when the position of the node overlaps with the area of coverage, wherein the environment includes multiple cameras and each of the cameras is associated with a different detection model;
identifying a video frame of interest, at the edge node, generated by the camera by an object model that corresponds to the camera and that operates at the edge node, wherein the video frame of interest has an objectness score greater than a threshold objectness score;
transmitting the video frame of interest with the node, wherein the node only receives video frames of interest from the edge node;
inputting the event and the video frame of interest generated by the camera into a detection model, wherein the event and the video frame of interest are related based on a timestamp of the event and a timestamp of the video frame of interest;
inputting an output of the detection model and an output of the event model into a decision pipeline;
determining an action by the decision pipeline base on the output of the detection model and the output of the event model; and
performing the action by the node.

2. The method of claim 1, further comprising determining a predicted position of the node using a trajectory prediction model, wherein the position of the node input to the event model and/or the detection model is the predicted position.

3. The method of claim 1, further comprising determining an objectness score for video frames received from the camera in the environment and identifying the video frame of interest based on objectness scores of the video frames, wherein the video frame of interest selected from the video frames has the objectness score, wherein a timestamp of the video frame of interest and a timestamp of the position of the node are the same or sufficiently close in time.

4. The method of claim 1, further comprising deploying the detection model to the nodes operating in the environment or running the detection model on an edge node configured to operate with the nodes operating in the environment.

5. The method of claim 1, further comprising training the detection model using historical positions of the node that correlate with historical video frames of interest in a video database and historical events included in an event database.

6. The method of claim 1, wherein the positions of the nodes are stored in a table that relates the positions of the nodes to each other, further comprising updating the positions of the node in the table using at least most recent sensor data.

7. The method of claim 6, wherein updating the positions includes updating the positions with predicted positions.

8. The method of claim 1, wherein the decision pipeline performs object-driven event detection and performs actions based on detected events.

9. In an environment that includes an edge node in communication with nodes operating in the environment over a network, wherein the environment includes a plurality of cameras that are each associated with an area of coverage in the environment, a method for performing object based detection, the method comprising:
for each node in the environment:
determining a position of a node operating in the environment at the node, wherein the node includes sensors that generate sensor data that includes position data;
inputting the sensor data into an event model operating at the node, wherein the event model generates an inference of an event based on the sensor data;
determining, by an overlap engine, that the node is in an area of coverage of a camera in the environment when the position of the node overlaps with the area of coverage, wherein the environment includes multiple cameras and each of the cameras is associated with a different detection model;
identifying a video frame of interest, at the edge node, generated by the camera by an object model that corresponds to the camera and that operates at the edge node, wherein the video frame of interest has an objectness score greater than a threshold objectness score;
transmitting the video frame of interest with the node, wherein the node only receives video frames of interest from the edge node;
inputting the event and the video frame of interest generated by the camera into a detection model, wherein the event and the video frame of interest are related based on a timestamp of the event and a timestamp of the video frame of interest;
inputting an output of the detection model and an output of the event model into a decision pipeline;
determining an action by the decision pipeline base on the output of the detection model and the output of the event model; and
performing the action by the node.

10. The non-transitory storage medium of claim 9, further comprising determining a predicted position of the node using a trajectory prediction model, wherein the position of the node input to the event model and/or the detection model is the predicted position.

11. The non-transitory storage medium of claim 9, further comprising determining an objectness score for video frames received from the camera in the environment and identifying the video frame of interest based on objectness scores of the video frames, wherein the video frame of interest selected from the video frames has the objectness score, wherein a timestamp of the video frame of interest and a timestamp of the position of the node are the same or sufficiently close in time.

12. The non-transitory storage medium of claim 9, further comprising deploying the detection model to the nodes operating in the environment or running the detection model on an edge node configured to operate with the nodes operating in the environment.

13. The non-transitory storage medium of claim 9, further comprising training the detection model using historical positions of the node that correlate with historical video frames of interest in a video database and historical events included in an event database.

14. The non-transitory storage medium of claim 9, wherein the positions of the nodes are stored in a table that relates the positions of the nodes to each other, further comprising updating the positions of the node in the table using at least most recent sensor data.

15. The non-transitory storage medium of claim 14, wherein updating the positions includes updating the positions with predicted positions.

16. The non-transitory storage medium of claim 9, wherein the decision pipeline performs object-driven event detection and performs actions based on detected events.

\* \* \* \* \*